United States Patent
Yamamoto (10) Patent No.: US 10,479,434 B2
(45) Date of Patent: Nov. 19, 2019

(54) SADDLE-RIDING-TYPE ELECTRIC VEHICLE FUEL CELL STACK FIXATION STRUCTURE

(71) Applicant: HONDA MOTOR CO., LTD., Minato-ku, Tokyo (JP)

(72) Inventor: Kanta Yamamoto, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 41 days.

(21) Appl. No.: 15/706,344

(22) Filed: Sep. 15, 2017

(65) Prior Publication Data

US 2018/0086408 A1 Mar. 29, 2018

(30) Foreign Application Priority Data

Sep. 29, 2016 (JP) .................... 2016-191828

(51) Int. Cl.
| | |
|---|---|
| *B60L 11/18* | (2006.01) |
| *B62K 11/04* | (2006.01) |
| *B62M 7/02* | (2006.01) |
| *B62J 35/00* | (2006.01) |
| *B60L 50/71* | (2019.01) |

(52) U.S. Cl.
CPC .............. *B62K 11/04* (2013.01); *B60L 50/71* (2019.02); *B62J 35/00* (2013.01); *B62M 7/02* (2013.01); *B60L 2200/12* (2013.01)

(58) Field of Classification Search
CPC .......... B62K 11/00; B60L 50/71; B62J 35/00; B62M 7/02
USPC ........................................................ 180/220
See application file for complete search history.

(56) References Cited

U.S. PATENT DOCUMENTS

| | | | |
|---|---|---|---|
| 8,007,005 B2* | 8/2011 | Yamashita | B62K 5/01 |
| | | | 280/785 |
| 8,435,688 B2* | 5/2013 | Shimizu | H01M 8/04014 |
| | | | 429/434 |
| 8,479,857 B2 | 7/2013 | Tamura | |
| 9,758,215 B2* | 9/2017 | Nagaya | B62M 7/12 |

(Continued)

FOREIGN PATENT DOCUMENTS

| | | |
|---|---|---|
| EP | 2 168 863 A1 | 3/2010 |
| EP | 3 225 522 A2 | 10/2017 |

(Continued)

OTHER PUBLICATIONS

Office Action issued in the corresponding Japanese patent application No. 2016-191828 with the English translation thereof and dated Jul. 24, 2018.

(Continued)

*Primary Examiner* — Jacob D Knutson
(74) *Attorney, Agent, or Firm* — Carrier Blackman & Associates, P.C.; William D. Blackman; Joseph P. Carrier (57) ABSTRACT

In a saddle-riding-type electric vehicle fuel cell stack fixation structure, a vehicle body frame includes: a pair of right and left main frames that extend rearward from a head pipe and that are arranged on an outer side in a vehicle width direction of a fuel cell stack; a pair of right and left downward frames that extend rearward from the head pipe and that are arranged below the pair of right and left main frames; and a cross member that bridges a space in a vehicle width direction between at least the right and left downward frames and that fixes the fuel cell stack.

13 Claims, 6 Drawing Sheets

(56) References Cited

U.S. PATENT DOCUMENTS

| | | | | |
|---|---|---|---|---|
| 2006/0037793 | A1* | 2/2006 | Horii | B62M 7/02 180/89.2 |
| 2006/0040161 | A1* | 2/2006 | Horii | B62M 7/02 180/65.1 |
| 2006/0251946 | A1* | 11/2006 | Makuta | H01M 8/2475 429/470 |
| 2007/0122671 | A1* | 5/2007 | Shimizu | H01M 8/04014 429/439 |
| 2008/0093148 | A1* | 4/2008 | Takahashi | B60L 58/33 180/220 |
| 2010/0294582 | A1* | 11/2010 | Eguchi | B62K 11/10 180/220 |
| 2014/0262568 | A1* | 9/2014 | Matsuda | B62K 11/04 180/65.1 |
| 2014/0353061 | A1* | 12/2014 | Iida | B60K 15/07 180/220 |
| 2014/0367183 | A1 | 12/2014 | Matsuda | |
| 2017/0113566 | A1* | 4/2017 | Shimonihara | B60L 50/72 |

FOREIGN PATENT DOCUMENTS

| | | | |
|---|---|---|---|
| JP | 02-081781 | A | 3/1990 |
| JP | 2007-118666 | A | 5/2007 |
| JP | 2008-247324 | A | 10/2008 |
| JP | 2009-078624 | A | 4/2009 |
| JP | 2015020632 | A * | 2/2015 |
| JP | 2015-077910 | A | 4/2015 |
| JP | 2017185986 | A * | 10/2017 |
| WO | 2012/085976 | A1 | 6/2012 |

OTHER PUBLICATIONS

Extended European search report issued in the corresponding EP Patent Application 17192903.7 dated Feb. 6, 2018.

Office Action issued in the corresponding Indian patent application No. 201714032219 with the English translation thereof dated Jul. 31, 2019.

* cited by examiner

SADDLE-RIDING-TYPE ELECTRIC VEHICLE FUEL CELL STACK FIXATION STRUCTURE

CROSS-REFERENCE TO RELATED APPLICATION

Priority is claimed on Japanese Patent Application No. 2016-191828, filed on Sep. 29, 2016, the contents of which are incorporated herein by reference.

BACKGROUND

Field of the Invention

The present invention relates to a saddle-riding-type electric vehicle fuel cell stack fixation structure.

Background

In the related art, as one of fuel cell arrangement structures of fuel cell vehicles, for example, a structure disclosed in Japanese Unexamined Patent Application, First Publication No. 2009-78624 is known. In the structure, a fuel cell, a fuel cylinder, and a secondary cell are arranged, in a state where the fuel cell, the fuel cylinder, and the secondary cell are overlapped with one another in a vertical direction, at a vehicle body front position between a head pipe that is provided on a vehicle body frame front part and a driver seat that is provided on a vehicle body frame rear part. A pair of right and left main frame members that extend rearward from the head pipe is provided at an outer position in a vehicle width direction of the fuel cell.

SUMMARY

However, a fuel cell fixation structure is not specifically disclosed. Therefore, the fuel cell fixation structure has room for improvement in reducing the number of components.

An object of an aspect of the present invention is to reduce the number of components in a fuel cell stack fixation structure of a saddle-riding-type electric vehicle that includes a vehicle body frame which supports a fuel cell stack.

(1) A saddle-riding-type electric vehicle fuel cell stack fixation structure according to an aspect of the present invention includes: a fuel cell stack; and a vehicle body frame that supports the fuel cell stack, wherein the vehicle body frame includes: a pair of right and left main frames that extend rearward from a head pipe and that are arranged on an outer side in a vehicle width direction of the fuel cell stack; a pair of right and left downward frames that extend rearward from the head pipe and that are arranged below the pair of right and left main frames; and a cross member that bridges a space in a vehicle width direction between at least the right and left downward frames and that fixes the fuel cell stack.

(2) In the above saddle-riding-type electric vehicle fuel cell stack fixation structure, the cross member may include: an upper cross member that bridges a space in a vehicle width direction between the right and left main frames and that fixes the fuel cell stack; and a lower cross member that bridges a space in a vehicle width direction between the right and left downward frames and that fixes the fuel cell stack.

(3) The above saddle-riding-type electric vehicle fuel cell stack fixation structure may further include: a vehicle component accommodation part that is arranged below the downward frame and that accommodates a vehicle component; and an accommodation part support member that is attached to the vehicle body frame and that supports the vehicle component accommodation part.

(4) In the above saddle-riding-type electric vehicle fuel cell stack fixation structure, the cross member may include a plate-like member that fixes an upper surface or a lower surface of the fuel cell stack.

(5) In the above saddle-riding-type electric vehicle fuel cell stack fixation structure, the cross member may include: an upper cross member that bridges a space in a vehicle width direction between the right and left main frames; and a lower cross member that bridges a space in a vehicle width direction between the right and left downward frames, and the upper cross member may be lighter than the lower cross member.

(6) In the above saddle-riding-type electric vehicle fuel cell stack fixation structure, the cross member may include an upper cross member that bridges a space in a vehicle width direction between the right and left main frames, and the upper cross member may include a vehicle component fixation part that fixes a vehicle component at an upper surface of a plate-like member.

(7) The above saddle-riding-type electric vehicle fuel cell stack fixation structure may further include a seat frame that is dividable into upper and lower parts.

(8) In the above saddle-riding-type electric vehicle fuel cell stack fixation structure, the seat frame may be formed of an electrically conductive member and may include a hydrogen tank accommodation part that accommodates a hydrogen tank.

(9) The above saddle-riding-type electric vehicle fuel cell stack fixation structure may further include a seat frame having a tube shape, wherein an opening part that covers an exhaust port which is provided at a rear part of the fuel cell stack may be provided at a front part of the seat frame, and a connection member that connects the seat frame and the vehicle body frame may be provided at an outer position of the opening part.

According to the above configuration (1), the vehicle body frame includes the pair of right and left main frames that extend rearward from the head pipe and that are arranged on the outer side in the vehicle width direction of the fuel cell stack, and thereby, the pair of right and left main frames can also protect the fuel cell stack. Additionally, the vehicle body frame includes the cross member that bridges the space in the vehicle width direction between at least the right and left downward frames and that fixes the fuel cell stack. Thereby, the cross member can ensure the rigidity of the vehicle body frame, and it is possible to perform positioning of the fuel cell stack using the cross member. Accordingly, it is possible to reduce the number of components. Additionally, the fuel cell stack is provided at a low position of the vehicle, and therefore, it is possible to lower the position of the center of gravity and improve travel stability.

According to the above configuration (2), the cross member includes: the upper cross member that bridges the space in the vehicle width direction between the right and left main frames and that fixes the fuel cell stack; and the lower cross member that bridges the space in the vehicle width direction between the right and left downward frames and that fixes the fuel cell stack, and thereby, the fuel cell stack functions as a rigid member that connects the pair of right and left main frames and the pair of right and left downward frames. Therefore, it is possible to improve the rigidity of the vehicle body frame.

According to the above configuration (3), the vehicle component accommodation part that is arranged below the downward frame and that accommodates the vehicle component is further provided, and thereby, the vehicle component is provided at a low position of the vehicle. Therefore, it is possible to lower the position of the center of gravity and improve travel stability. The above configuration (3) is preferably applied, for example, to a case in which the vehicle component is an electric component such as a battery which is a heavy component. Additionally, the accommodation part support member that is attached to the vehicle body frame and that supports the vehicle component accommodation part is further provided, and thereby, a plurality of vehicle components can be subassembled to the vehicle component accommodation part and then be assembled to the vehicle body frame. Therefore, it is possible to improve an assembly property.

According to the above configuration (4), the cross member includes the plate-like member that fixes the upper surface or the lower surface of the fuel cell stack, and thereby, it is possible to further firmly fix the fuel cell stack.

According to the above configuration (5), the upper cross member is lighter than the lower cross member, and thereby, the position of the center of gravity of the vehicle is lowered. Therefore, it is possible to improve travel stability. The above configuration (5) is preferably applied, for example, to a case in which the upper cross member is formed of a lightweight material such as aluminum, and the lower cross member is formed of a heavyweight material such as iron.

According to the above configuration (6), the upper cross member includes the vehicle component fixation part that fixes the vehicle component at the upper surface of the plate-like member, and thereby, it is possible to stably fix the vehicle component by the upper surface of the plate-like member. The above configuration (6) is preferably applied, for example, to a case in which the vehicle component is an electric component such as a control device.

According to the above configuration (7), the seat frame that is dividable into upper and lower parts is further provided, and thereby, it is possible to use an inner space of the seat frame as an accommodation space. Additionally, by making the upper seat frame to be open, it is possible to easily accommodate the vehicle component to the inner space of the seat frame.

According to the above configuration (8), the seat frame is formed of the electrically conductive member and includes the hydrogen tank accommodation part that accommodates the hydrogen tank, and thereby, an electric potential is sparsely distributed via the main frame from the seat frame. Therefore, according to a grounding effect, it is possible to prevent static electricity from being generated in the vicinity of the hydrogen tank.

According to the above configuration (9), the seat frame having a tube shape is further provided, and the opening part that covers the exhaust port which is provided at the rear part of the fuel cell stack is provided at the front part of the seat frame, and thereby, exhaust air (besides, travel air, cooling air, and the like) which is emitted rearward from the fuel cell stack can be guided smoothly to a vehicle rear part. Additionally, the connection member that connects the seat frame and the vehicle body frame is provided at the outer position of the opening part, and thereby, it is possible to improve the rigidity of the vehicle body frame.

DESCRIPTION OF THE EMBODIMENTS

Hereinafter, an embodiment of the present invention will be described with reference to the drawings. Note that, front, rear, right, and left directions and the like in the following description are the same as front, rear, right, and left directions and the like of a vehicle described below if there is no particular description. In addition, in the drawings referred to in the following description, an arrow FR which indicates the front of the vehicle, an arrow LH which indicates the left of the vehicle, and an arrow UP which indicates the upside of the vehicle are shown.

<Entire Vehicle>

Figure 1:
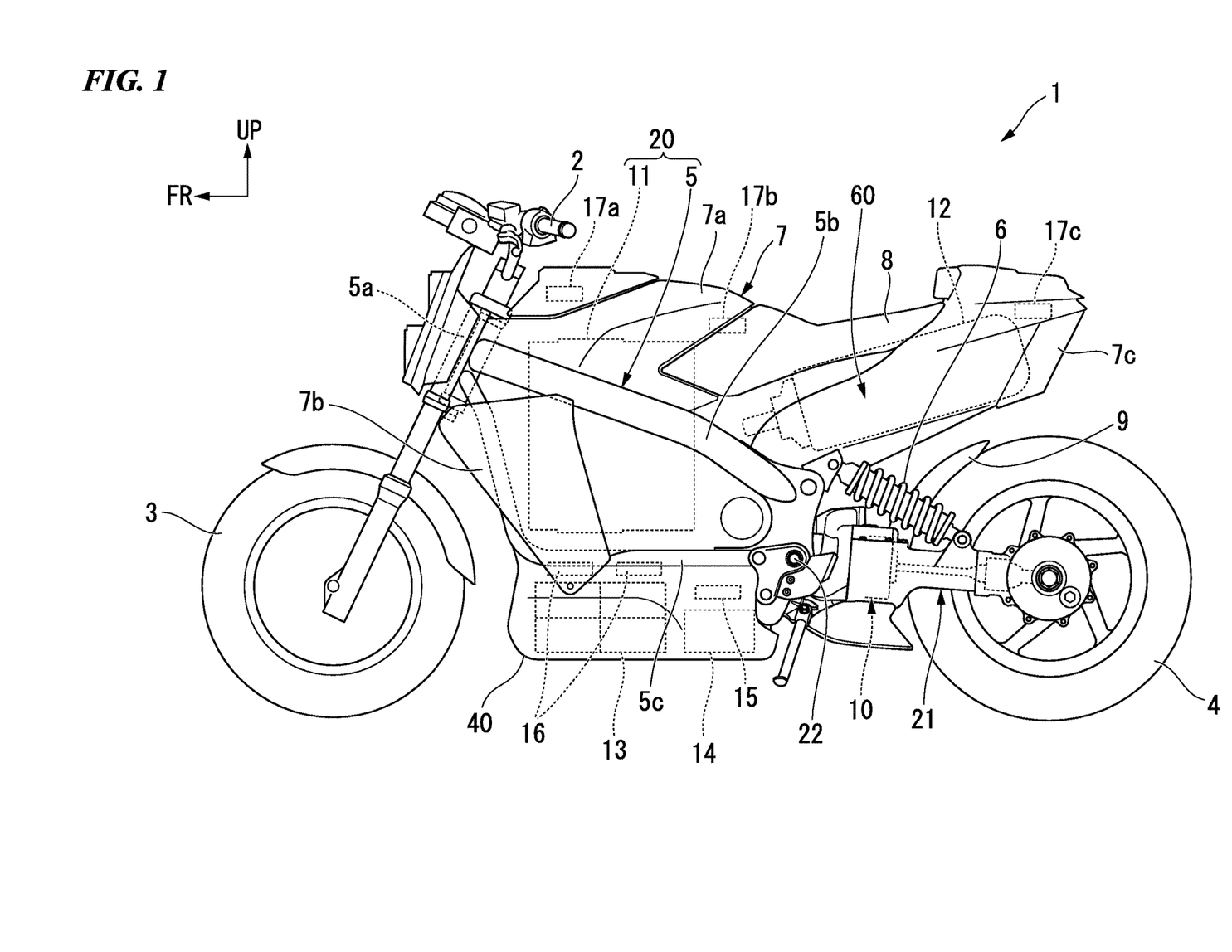
FIG. 1 is a left side view of a motorcycle according to an embodiment.

FIG. 1 shows a motorcycle 1 as an example of a saddle-riding-type electric vehicle. With reference to FIG. 1, the motorcycle 1 includes: a front wheel 3 that is steered by a handle 2; and a rear wheel 4 that is driven by a drive unit 10 including an electric motor (not shown). Hereinafter, the motorcycle 1 may be simply referred to as a "vehicle".

A steering system component including the handle 2 and the front wheel 3 is steerably and pivotally supported by a head pipe 5a that is formed on a front end part of a vehicle body frame 5. A handle steering shaft (not shown) that is connected to the handle 2 is inserted through the head pipe 5a. A swing arm 21 to which the drive unit 10 is attached is pivotally supported swingably upward and downward around a pivot shaft 22 on a rear part of the vehicle body frame 5. A rear suspension 6 is provided between a front part of the swing arm 21 and a rear part of the vehicle body frame 5.

For example, the vehicle body frame 5 is formed by integrally joining a variety of steel materials by welding or the like. The vehicle body frame 5 includes: a pair of right and left main frames 5b that extend rearward from the head pipe 5a and that are arranged on an outer side in a vehicle width direction of a fuel cell stack 11; a pair of right and left downward frames 5c that extend rearward from the head pipe 5a and that are arranged below the pair of right and left main frames 5b; and a cross member 30 (refer to FIG. 2) that bridges a space in the vehicle width direction between at least the right and left downward frames 5c and that fixes the fuel cell stack 11.

Specifically, the right and left main frames 5b extend rearward and downward from a middle part in a vertical direction of the head pipe 5a and are then bent downward to extend. The right downward frame 5c is slightly slanted to extend downward from a lower part of the head pipe 5a such that a lower part is positioned more rearward, is then bent rearward to extend, and is connected to a rear lower part of the right main frame 5b. The left downward frame 5c is slightly slanted to extend downward from a lower part of the head pipe 5a such that a lower part is positioned more rearward, is then bent rearward to extend, and is connected to a rear lower part of the left main frame 5b. The cross member 30 (refer to FIG. 2) extends in the vehicle width direction so as to connect the right and left main frames 5b and connect the right and left downward frames 5c.

The vehicle body frame 5 is covered by a vehicle body cover 7. The vehicle body cover 7 includes: an upper cowl 7a that covers an upper part of the vehicle body frame 5; a front side cowl 7b that covers a front side part of the vehicle body frame 5; and a rear cowl 7c that covers a rear part of the vehicle body frame 5. An occupant is seated on a seat 8. A rear fender 9 covers a front upper part of the rear wheel 4.

In the present embodiment, a power generation system that changes a chemical energy to an electric energy by a chemical reaction between hydrogen and oxygen is adopted. A fuel cell stack 11 having a cuboid shape, a hydrogen tank 12 having a cylindrical shape, a hydrogen supply system (not shown), a battery 13, an inverter 14, a PDU (power drive unit) 15 that controls the flow of electricity, a VCU (voltage control unit) 16 that raises and lowers a voltage, and the like are provided on the vehicle.

The hydrogen supply system (not shown) supplies hydrogen that is stored in the hydrogen tank 12 to the fuel cell stack 11. The fuel cell stack 11 generates electricity by the supplied hydrogen and oxygen in external air. The electricity is used for charging the battery 13 and is supplied to the inverter 14 and an electric component (not shown). The inverter 14 electrically generates an AC power from a DC power that is supplied from at least one of the fuel cell stack 11 and the battery 13. The electric motor (not shown) is driven to be rotated by the AC power that is generated by the inverter 14 and drives the rear wheel 4. Hydrogen sensors 17a, 17b, 17c detect hydrogen.

<Fuel Cell Stack Fixation Structure>

As shown in FIG. 1, a fuel cell stack fixation structure 20 includes: the fuel cell stack 11; and the vehicle body frame 5 that supports the fuel cell stack 11.

<Cross Member>

Figure 2:
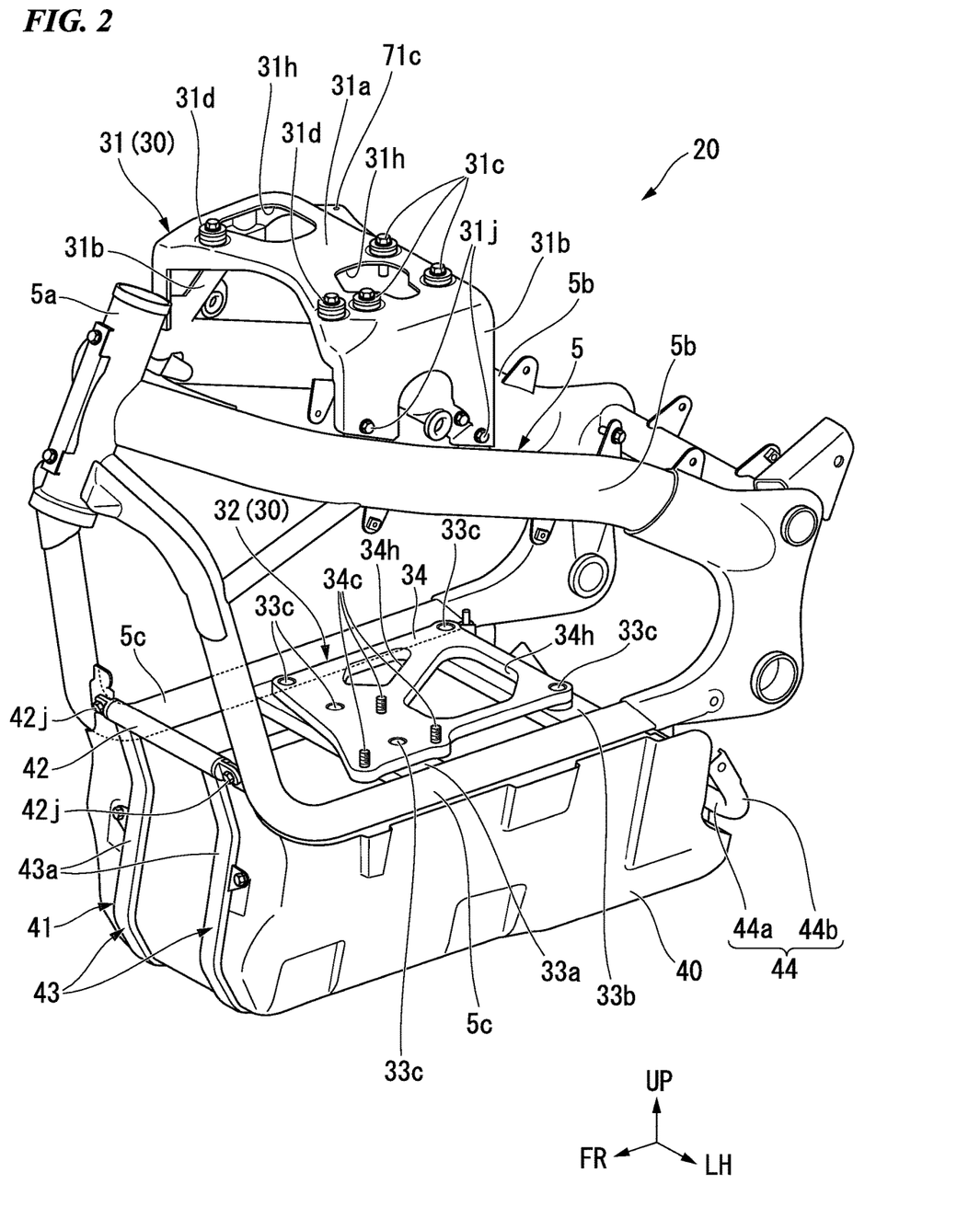
FIG. 2 is a perspective view of a fuel cell stack fixation structure seen from the left front according to the embodiment.

As shown in FIG. 2, the vehicle body frame 5 includes as a cross member 30: an upper cross member 31 that bridges a space in the vehicle width direction between the right and left main frames 5b and that fixes an upper part of the fuel cell stack 11 (refer to FIG. 1); and a lower cross member 32 that bridges a space in the vehicle width direction between the right and left downward frames 5c and that fixes a lower part of the fuel cell stack 11 (refer to FIG. 1).

The upper cross member 31 has a U shape (that is, an inverse U shape) that opens a lower part in a front view. Specifically, the upper cross member 31 includes: a top wall 31a that extends in the vehicle width direction; and a pair of right and left side walls 31b. The right side wall 31b extends downward from a right end in the vehicle width direction of the top wall 31a, branches in front and rear parts, and reaches to an upper end edge of the right main frame 5b. The left side wall 31b extends downward from a left end in the vehicle width direction of the top wall 31a, branches in front and rear parts, and reaches to an upper end edge of the left main frame 5b.

The top wall 31a is a plate-like member that fixes an upper surface of the fuel cell stack 11 (refer to FIG. 1). A plurality of (for example, three in the present embodiment) upper fixation part 31c that fix an upper surface of the fuel cell stack 11 (refer to FIG. 1) are provided on the top wall 31a. For example, in the upper fixation part 31c, the upper surface of the fuel cell stack 11 (refer to FIG. 1) is fastened and fixed to the top wall 31a by a fastening member such as a bolt such that a vibration isolation member such as a rubber bush is interposed between the upper surface of the fuel cell stack 11 and the top wall 31a. Additionally, an upper surface of the top wall 31a functions as a vehicle component fixation part that fixes a vehicle component (for example, an electric component such as a control device 18 shown in FIG. 4). A case member support part 31d supports a case member 50 described below (refer to FIG. 4).

A plurality of (for example, two in the present embodiment) penetration holes 31h that open in a thickness direction of the top wall 31a are formed on the top wall 31a. Thereby, the upper cross member 31 can be made lightweight. The two penetration holes 31h are arranged so as to avoid the upper fixation part 31c and the case member support part 31d and to be away from each other in the vehicle width direction.

Front and rear lower end edges of the right side wall 31b are gradually slanted rearward and downward along an upper end edge of the right main frame 5b. Front and rear lower end edges of the left side wall 31b are gradually slanted rearward and downward along an upper end edge of the left main frame 5b. Front and rear lower end parts of the right side wall 31b are fastened and fixed to the right main frame 5b (specifically, a protrusion part that protrudes upward from an upper end edge of the right main frame 5b) by a fastening member 31j such as a bolt. Front and rear lower end parts of the left side wall 31b are fastened and fixed to the left main frame 5b (specifically, a protrusion part that protrudes upward from an upper end edge of the left main frame 5b) by a fastening member 31j such as a bolt.

The lower cross member 32 includes: a pair of front and rear connection plates 33a, 33b that bridge a space in the vehicle width direction between the right and left downward frames 5c; and a lower plate 34 that is a plate-like member which fixes a lower part of the fuel cell stack 11 (refer to FIG. 1). The lower plate 34 may, alternatively, be referred to as a fuel cell support plate, since it supports the fuel cell stack 11 thereon.

The front and rear connection plates 33a, 33b have a straight line shape that extends in the vehicle width direction. The front and rear connection plates 33a, 33b are spaced away from each other in a front-to-rear direction. Specifically, the front connection plate 33a is arranged at a front lower position of the fuel cell stack 11 (refer to FIG. 1). On the other hand, the rear connection plate 33b is arranged at a rear lower position of the fuel cell stack 11 (refer to FIG. 1). Thereby, it is possible to stably support the fuel cell stack 11 (refer to FIG. 1) in a well-balanced manner in the front-to-rear direction.

The lower plate 34 is fixed to the front and rear connection plates 33a, 33b at a plurality of parts (for example, in the present embodiment, total five parts that are three parts of the front connection plate 33a and two parts of the rear connection plate 33b, refer to reference numeral 33c in the drawing). For example, at fixation parts 33c, the lower plate 34 is fastened and fixed to the front and rear connection plates 33a, 33b by a fastening member such as a bolt such that a vibration isolation member such as a rubber bush is interposed between the lower plate 34 and the front and rear connection plates 33a, 33b.

A plurality of (for example, three in the present embodiment) lower fixation parts 34c that fix a lower surface of the fuel cell stack 11 (refer to FIG. 1) are provided on the lower plate 34. The lower fixation part 34c is an axis part (male screw part) of a bolt that protrudes upward from an upper surface of the lower plate 34. For example, a plurality of (for example, three in the present embodiment) recess parts (female screw part, not shown) that is concaved upward are formed on a lower surface of the fuel cell stack 11 (refer to FIG. 1). The lower plate 34 is fastened and fixed to the recess part of the lower surface of the fuel cell stack 11 by the lower fixation part 34c.

For example, the depth (vertical height) of the recess part may be larger than the vertical height of the lower fixation part 34c. Thereby, by inserting the lower fixation part 34c to the recess part (not shown) from below while screwing the lower fixation part 34c and allowing the lower surface of the fuel cell stack 11 (refer to FIG. 1) to come into contact with the upper surface of the lower plate 34, it is possible to stably support the lower surface of the fuel cell stack 11 (refer to FIG. 1).

A plurality of (for example, two in the present embodiment) penetration holes 34h that open in a thickness direction of the lower plate 34 are formed on the lower plate 34. Thereby, the lower cross member 32 (lower plate 34) can be made lightweight. The two penetration holes 34h are arranged so as to avoid the fixation part 33c and the lower fixation part 34c.

In the present embodiment, the upper cross member 31 is lighter than the lower cross member 32. For example, the upper cross member 31 is formed of a lightweight material such as aluminum, and the lower cross member 32 is formed of a heavyweight material such as iron. Additionally, the thickness of the upper cross member 31 may be thinner than the thickness of the lower cross member 32 (specifically, the thickness of each of the front and rear connection plates 33a, 33b and the lower plate 34).

<Vehicle Component Accommodation Part>

A vehicle component accommodation part 40 that accommodates a vehicle component is arranged below the downward frame 5c. The vehicle component accommodation part 40 has a box shape that opens upward and that is elongated in the front-to-rear direction. As shown in FIG. 1, the vehicle component accommodation part 40 accommodates a vehicle component such as the battery 13, the inverter 14, the PDU 15, and the VCU 16.

<Accommodation Part Support Member>

As shown in FIG. 2, the fuel cell stack fixation structure 20 further includes an accommodation part support member 41 that is attached to the vehicle body frame 5 and that supports the vehicle component accommodation part 40.

Figure 3:
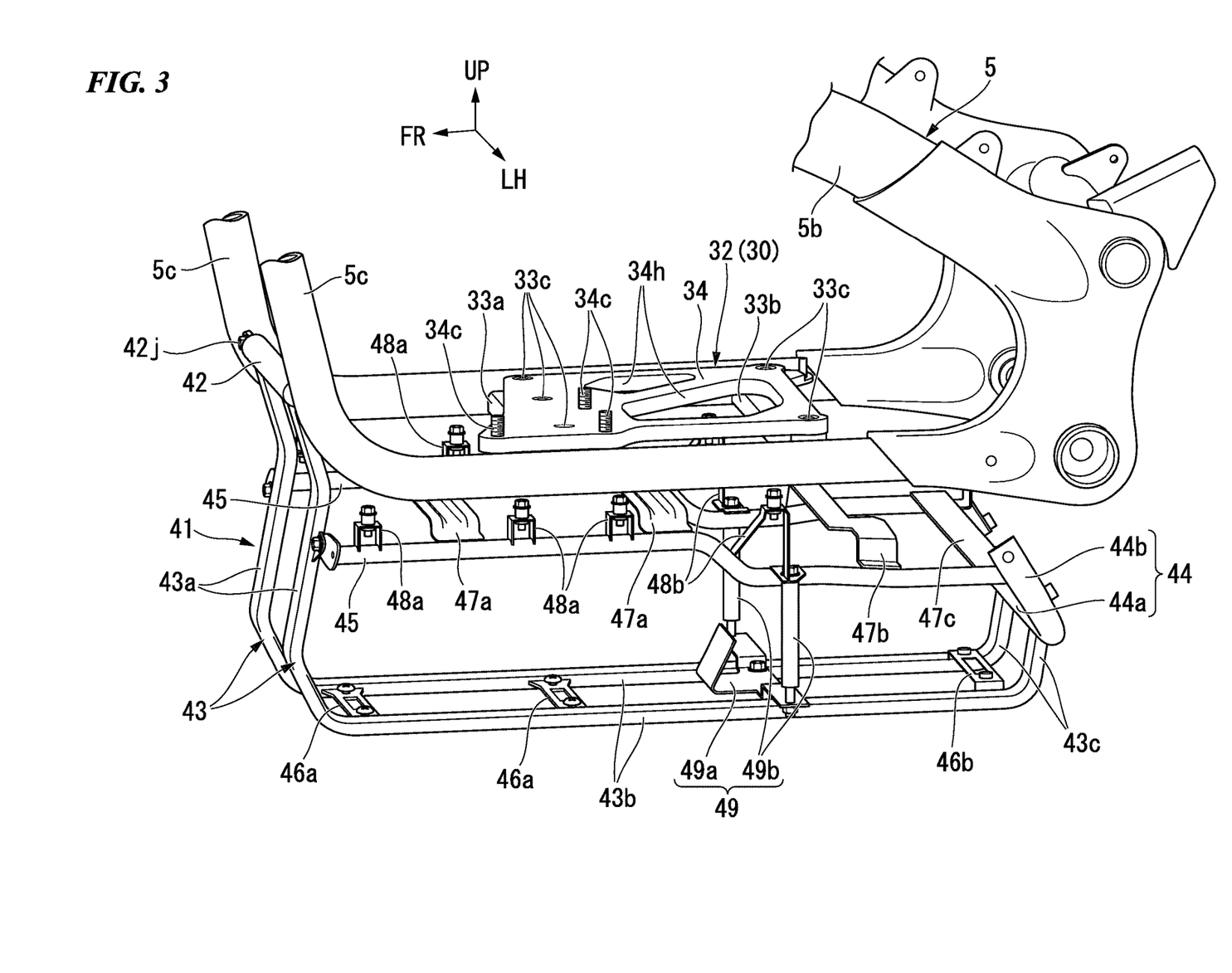
FIG. 3 is a perspective view of an accommodation part support member seen from the left front according to the embodiment.

As shown in FIG. 3, the accommodation part support member 41 includes: a first connection member 42 that bridges a space in the vehicle width direction between front lower parts of the right and left downward frames 5c; a pair of right and left support member main bodies 43 that extend downward from the first connection member 42, are then bent rearward to extend and are then bent upward to extend; a second connection member 44 that bridges a space in the vehicle width direction between rear end parts of the pair of right and left support member main bodies 43; and a pair of right and left third connection members 45. The right third connection member 45 bridges a space in the front-to-rear direction between a front part of the right support member main body 43 and the second connection member 44. The left third connection member 45 bridges a space in the front-to-rear direction between a front part of the left support member main body 43 and the second connection member 44.

The first connection member 42 has a straight line shape that extends in the vehicle width direction. A right end part in the vehicle width direction of the first connection member 42 is fastened and fixed to a front lower part (specifically, a protrusion part that protrudes inward in the vehicle width direction from a front lower part of the right downward frame 5c) of the right downward frame 5c by a fastening member 42j such as a bolt. A left end part in the vehicle width direction of the first connection member 42 is fastened and fixed to a front lower part (specifically, a protrusion part that protrudes inward in the vehicle width direction from a front lower part of the left downward frame 5c) of the left downward frame 5c by a fastening member 42j such as a bolt.

The support member main body 43 extends along an external form of the vehicle component accommodation part 40 (refer to FIG. 2). Specifically, the support member main body 43 includes: a front connection part 43a that extends rearward and downward from the first connection member 42, is then bent frontward and downward to extend, and is then bent rearward and downward to extend; a middle connection part 43b that extends rearward straight from a lower end of the front connection part 43a; and a rear connection part 43c that extends upward from a rear end of the middle connection part 43b. Connection parts 46a, 46b bridge a space in the vehicle width direction between the middle connection parts 43b in the right and left support member main bodies 43.

The second connection member 44 has a U shape that opens a front upper part. Specifically, the second connection member 44 includes: a second connection member main body 44a that extends in the vehicle width direction so as to bridge a space in the vehicle width direction between the rear connection parts 43c; and a pair of right and left extension parts 44b. The right extension part 44b extends frontward and upward from a right end in the vehicle width direction of the second connection member main body 44a. The left extension part 44b extends frontward and upward from a left end in the vehicle width direction of the second connection member main body 44a.

The third connection member 45 extends to have a crank shape in the front-to-rear direction so as to bridge a space in the front-to-rear direction between the front connection part 43a and the second connection member main body 44a. Specifically, the third connection member 45 extends rearward straight from an upper part (specifically, a protrusion part that protrudes outward in the vehicle width direction from an upper part of the front connection part 43a) of the front connection part 43a, is then bent inward in the vehicle width direction and rearward downward to extend, and is then extend rearward straight. Connection parts 47a, 47b, 47c bridge a space in the vehicle width direction between the right and left third connection members 45. Brackets 48a, 48b protrude upward from the right and left third connection members 45.

A bottom wall support member 49 that supports a bottom wall of the vehicle component accommodation part 40 (refer to FIG. 2) is joined to the third connection member 45. The bottom wall support member 49 includes: a bottom wall support member main body 49a that extends to have a crank shape in the vehicle width direction and that extends frontward from a middle part in the vehicle width direction and is then bent rearward and upward to extend; and a vertical extension part 49b. The right vertical extension part 49b vertically extends so as to bridge a space in the vertical direction between a right end in the vehicle width direction of the bottom wall support member main body 49a and the right third connection member 45. The left vertical extension part 49b vertically extends so as to bridge a space in the vertical direction between a left end in the vehicle width direction of the bottom wall support member main body 49a and the left third connection member 45.

<Vehicle Component Fixation Part>

Figure 4:
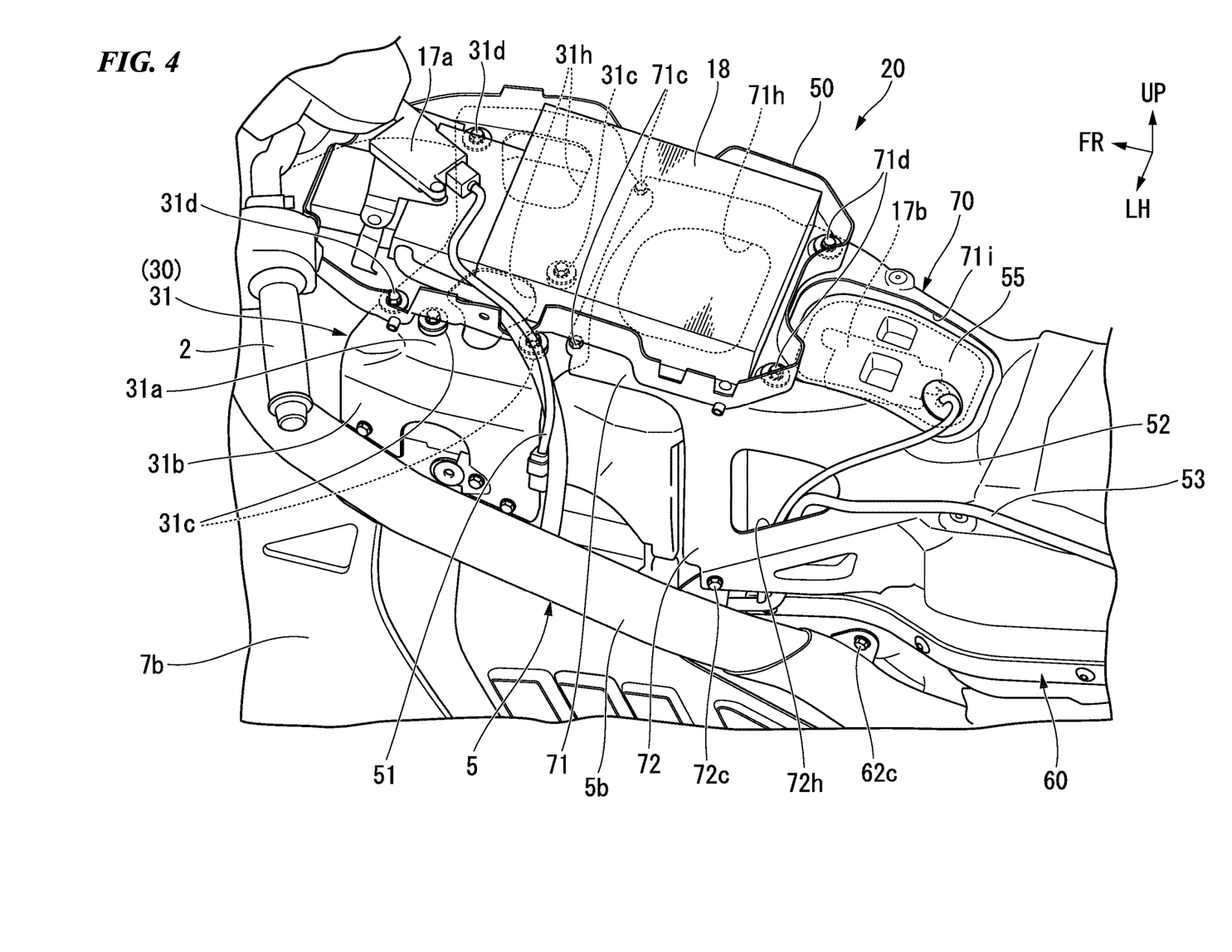
FIG. 4 is a perspective view of a vehicle component fixation part seen from the left above according to the embodiment.

FIG. 4 shows a state in which the upper cowl 7a (refer to FIG. 1) and the seat 8 (refer to FIG. 1) are removed from the vehicle. As shown in FIG. 4, a case member 50 that accommodates the control device 18 having a cuboid shape is arranged on an upper surface of the top wall 31a as the vehicle component fixation part. The case member 50 has a box shape that opens an upper part and that extends in the front-to-rear direction.

In the present embodiment, the control device 18 is fixed to an upper surface of the top wall 31a via a bottom wall of the case member 50. The case member 50 may not be provided. That is, the control device 18 may be directly fixed to the upper surface of the top wall 31a. Thereby, a vehicle upper part can be made lightweight.

A wiring 51 connects the hydrogen sensor 17a and the hydrogen supply system (not shown). A wiring 52 connects the hydrogen sensor 17b and the hydrogen supply system (not shown). A wiring 53 connects the hydrogen sensor 17c (refer to FIG. 1) and the hydrogen supply system (not shown).

<Seat Frame>

Figure 5:
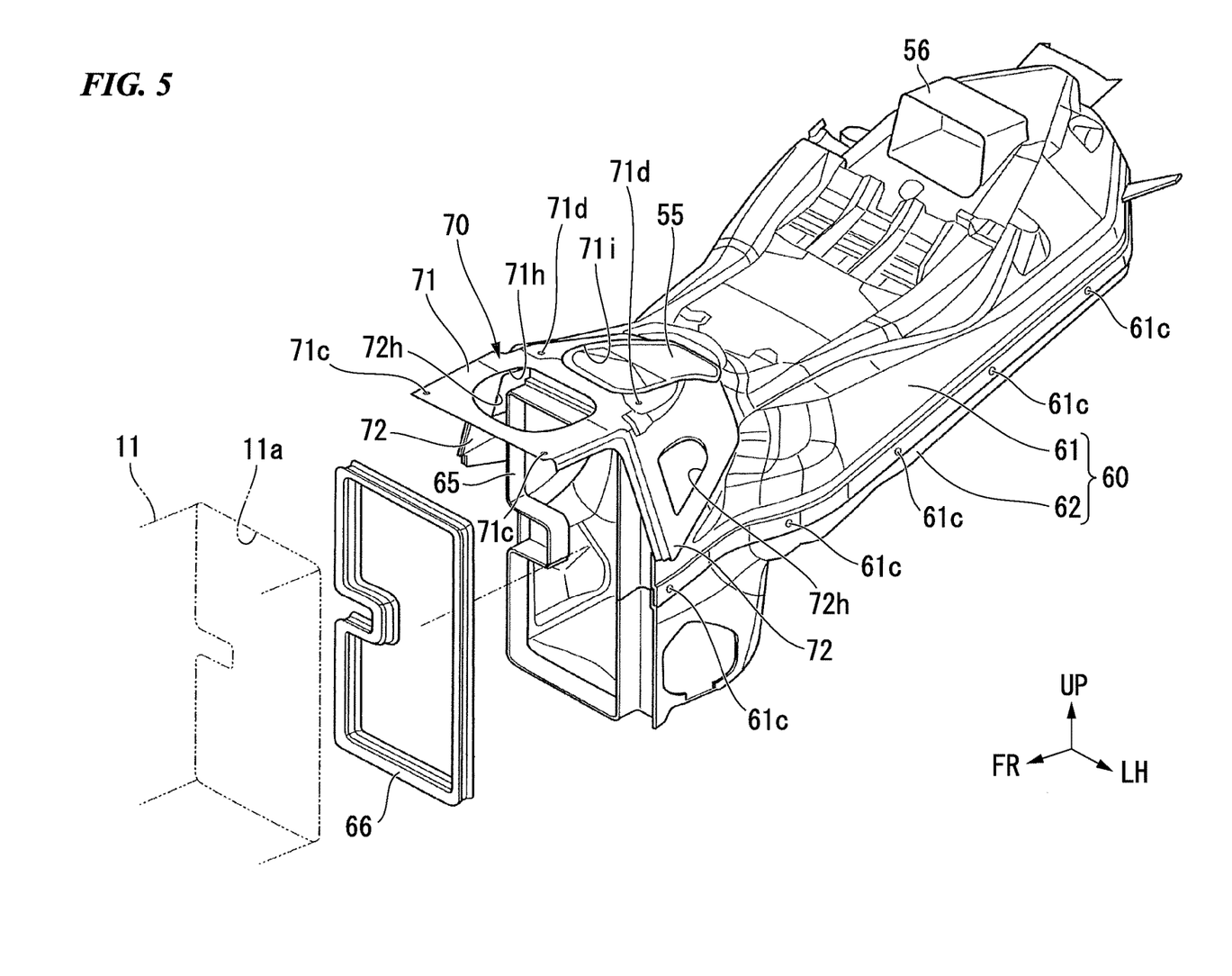
FIG. 5 is a perspective view of a seat frame seen from the left front according to the embodiment.

The fuel cell stack fixation structure 20 further includes a seat frame 60 that has a tube shape which extends in the front-to-rear direction and that is dividable into upper and lower parts. As shown in FIG. 5, the seat frame 60 includes: an upper seat frame 61 which has a U shape (inverse U shape) that opens a lower part in a front view; and a lower seat frame 62 which has a U shape that opens an upper part in a front view. The upper seat frame 61 is fastened and fixed to the lower seat frame 62 by a plurality of (only five members are shown in FIG. 5) fastening members 61c such as a bolt. A battery accommodation part 56 accommodates a battery (not shown).

Figure 6:
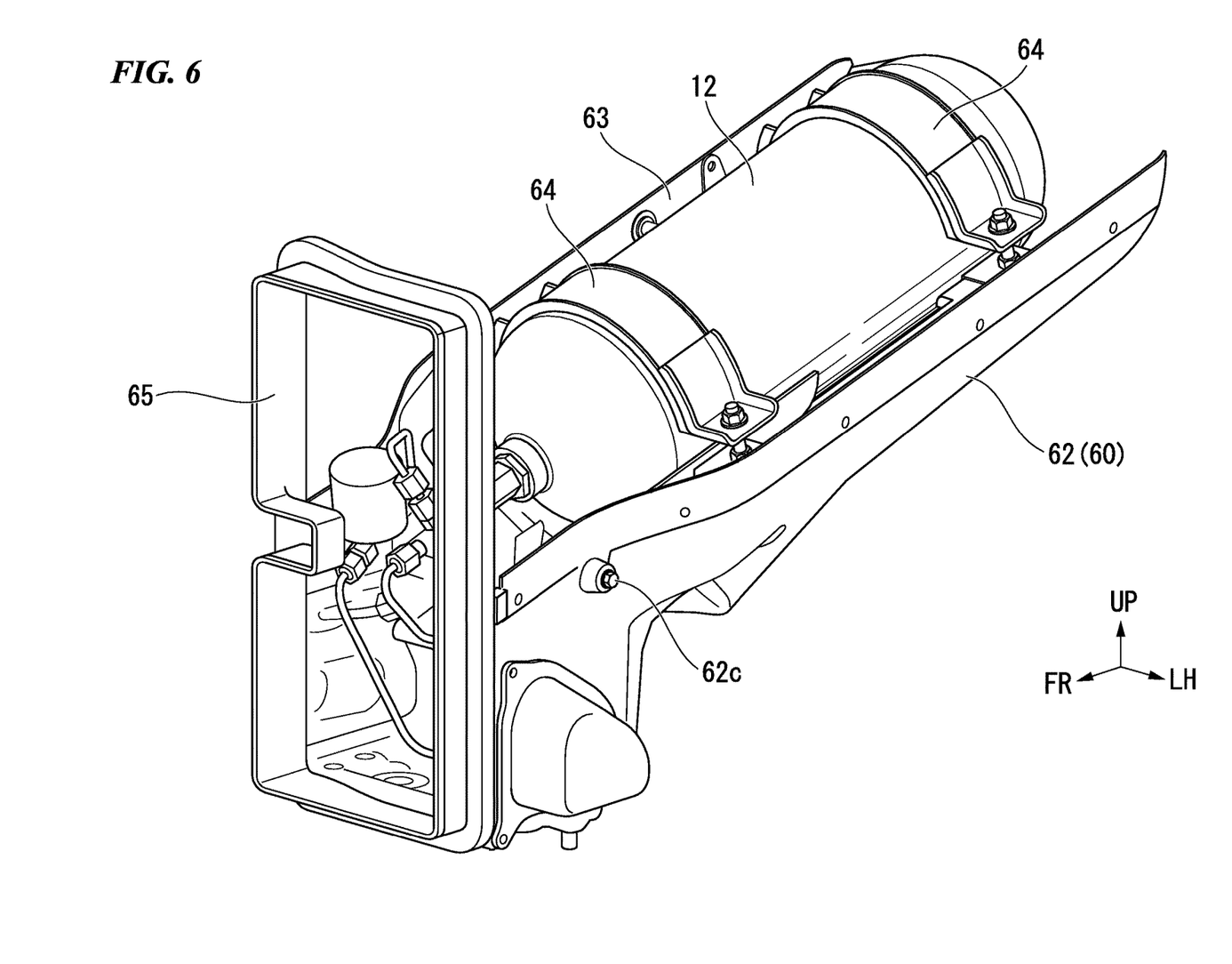
FIG. 6 is a perspective view of a hydrogen tank accommodation part seen from the left front according to the embodiment.

As shown in FIG. 6, the seat frame 60 is formed of an electrically conductive member and includes a hydrogen tank accommodation part 63 that accommodates the hydrogen tank 12. Examples of the electrically conductive member include carbon. In the present embodiment, the seat frame 60 is formed of carbon. An anchorage 64 fixes the hydrogen tank 12 and the lower seat frame 62.

A front upper part of the lower seat frame 62 is fixed (reference numeral 62c in the drawing represents a fixation part) to the right and left main frames 5b (specifically, a protrusion part that protrudes upward from an upper end edge of each of the right and left main frames 5b, refer to FIG. 4). For example, in the fixation part 62c, the front upper part of the lower seat frame 62 is fastened and fixed to the protrusion part of each of the right and left main frames 5b by a fastening member such as a bolt.

As shown in FIG. 5, an opening part 65 that covers an exhaust port 11a which is provided at a rear part of the fuel cell stack 11 is provided at a front part of the seat frame 60.

A seal member 66 having a frame shape is arranged between the exhaust port 11a of the fuel cell stack 11 and the opening part 65 of the seat frame 60. The outline of the exhaust port 11a of the fuel cell stack 11, the outline of the opening part 65 of the seat frame 60, and the external form of a seal member 66 have a homothetic shape. For example, the seal member 66 is in close contact with a rear end of the exhaust port 11a of the fuel cell stack 11 and is in close contact with an inner circumferential surface of the opening part 65 of the seat frame 60.

<Connection Member>

A connection member 70 that connects the seat frame 60 and the vehicle body frame 5 is provided at an outer position of the opening part 65. For example, the connection member 70 is formed of an electrically conductive member such as carbon. In the present embodiment, the connection member 70 is formed integrally with the upper seat frame 61.

The connection member 70 has a U shape (inverse U shape) that opens a lower part so as to cover a front upper part of the seat frame 60 from the above. Specifically, the connection member 70 includes: a connection member main body 71 that extends in the front-to-rear direction; and a pair of right and left side wall parts 72. The right side wall part 72 extends outward in the vehicle width direction and downward from a right end in the vehicle width direction of the connection member main body 71. The left side wall part 72 extends outward in the vehicle width direction and downward from a left end in the vehicle width direction of the connection member main body 71.

As shown in FIG. 4, a front end part of the connection member main body 71 is fixed to the upper cross member 31 (specifically, a protrusion part that protrudes rearward from a rear end of the top wall 31a) at a plurality of parts (for example, in the present embodiment, two parts on both sides in the vehicle width direction, refer to reference numeral 71c in the drawing). For example, in the fixation part 71c, the front end part of the connection member main body 71 is fastened and fixed to the protrusion part at the rear end of the top wall 31a by a fastening member such as a bolt.

Reference numeral 71d in the drawing represents a fixation part (for example, in the present embodiment, two parts on both sides in the vehicle width direction) between a rear end part of the case member 50 and the connection member main body 71. For example, at fixation parts 71d, the rear end part of the case member 50 is fastened and fixed to the connection member main body 71 by a fastening member such as a bolt such that a vibration isolation member such as a rubber bush is interposed between the rear end part of the case member 50 and the connection member main body 71.

As shown in FIG. 5, penetration holes 71h, 71i that open in a thickness direction of the connection member main body 71 are formed on the connection member main body 71. The penetration hole 71h is arranged at a part, which protrudes more frontward than the opening part 65 of the seat frame 60, of the connection member main body 71. The penetration hole 71i is arranged at a more rear position than the penetration hole 71h and at a part, which overlaps with a front upper part of the seat frame 60, of the connection member main body 71. The penetration hole 71i surrounds a cover 55 that covers an upper part of the hydrogen sensor 17b (refer to FIG. 4).

As shown in FIG. 4, a lower end part of the right side wall part 72 is fixed (reference numeral 72c in the drawing represents a fixation part) to the right main frame 5b (specifically, a protrusion part that protrudes upward from an upper end edge of the right main frame 5b). A lower end part of the left side wall part 72 is fixed (reference numeral 72c in the drawing represents a fixation part) to the left main frame 5b (specifically, a protrusion part that protrudes upward from an upper end edge of the left main frame 5b). For example, in the fixation part 72c, the lower end part of the right side wall part 72 is fastened and fixed to the protrusion part of the right main frame 5b by a fastening member such as a bolt. For example, in the fixation part 72c, the lower end part of the left side wall part 72 is fastened and fixed to the protrusion part of the left main frame 5b by a fastening member such as a bolt.

A penetration hole 72h that opens in a thickness direction of the right side wall part 72 is formed on the right side wall part 72. A penetration hole 72h that opens in a thickness direction of the left side wall part 72 is formed on the left side wall part 72. The wirings 52, 53 are inserted through the penetration hole 72h of the left side wall part 72.

As described above, the above embodiment includes: a fuel cell stack 11; and a vehicle body frame 5 that supports the fuel cell stack 11, wherein the vehicle body frame 5 includes: a pair of right and left main frames 5b that extend rearward from a head pipe 5a and that are arranged on an outer side in a vehicle width direction of the fuel cell stack 11; a pair of right and left downward frames 5c that extend rearward from the head pipe 5a and that are arranged below the pair of right and left main frames 5b; and a cross member 30 that bridges a space in a vehicle width direction between at least the right and left downward frames 5c and that fixes the fuel cell stack 11.

According to the configuration, the vehicle body frame 5 includes the pair of right and left main frames 5b that extend rearward from the head pipe 5a and that are arranged on the outer side in the vehicle width direction of the fuel cell stack 11, and thereby, the pair of right and left main frames 5b can also protect the fuel cell stack 11. Additionally, the vehicle body frame 5 includes the cross member 30 that bridges the space in the vehicle width direction between at least the right and left downward frames 5c and that fixes the fuel cell stack 11. Thereby, the cross member 30 can ensure the rigidity of the vehicle body frame 5, and it is possible to perform positioning of the fuel cell stack 11 using the cross member 30. Accordingly, it is possible to reduce the number of components. Additionally, the fuel cell stack 11 is provided at a low position of the vehicle, and therefore, it is possible to lower the position of the center of gravity and improve travel stability.

Further, in the above embodiment, the cross member 30 includes: the upper cross member 31 that bridges the space in the vehicle width direction between the right and left main frames 5b and that fixes the fuel cell stack 11; and the lower cross member 32 that bridges the space in the vehicle width direction between the right and left downward frames 5c and that fixes the fuel cell stack 11, and thereby, the fuel cell stack 11 functions as a rigid member that connects the pair of right and left main frames 5b and the pair of right and left downward frames 5c. Therefore, it is possible to improve the rigidity of the vehicle body frame 5.

Further, in the above embodiment, the vehicle component accommodation part 40 that is arranged below the downward frame 5c and that accommodates the vehicle component is further provided, and thereby, the vehicle component is provided at a low position of the vehicle. Therefore, it is possible to lower the position of the center of gravity and improve travel stability. The configuration is preferably applied, for example, to a case in which the vehicle component is an electric component such as a battery 13 which is a heavy component. Additionally, the accommodation part support member 41 that is attached to the vehicle body frame 5 and that supports the vehicle component accommodation part 40 is further provided, and thereby, a plurality of vehicle components can be subassembled to the vehicle component accommodation part 40 and then be assembled to the vehicle body frame 5. Therefore, it is possible to improve an assembly property.

Further, in the above embodiment, the cross member 30 includes the top wall 31a and the lower plate 34 as the plate-like member that fixes the upper surface or the lower surface of the fuel cell stack 11, and thereby, it is possible to further firmly fix the fuel cell stack 11.

Further, in the above embodiment, the upper cross member 31 is lighter than the lower cross member 32, and thereby, the position of the center of gravity of the vehicle is lowered. Therefore, it is possible to improve travel stability. The configuration is preferably applied, for example, to a case in which the upper cross member 31 is formed of a lightweight material such as aluminum, and the lower cross member 32 is formed of a heavyweight material such as iron.

Further, in the above embodiment, the upper cross member 31 includes the top wall 31a as the vehicle component fixation part that fixes the vehicle component at the upper surface of the plate-like member, and thereby, it is possible to stably fix the vehicle component by the upper surface of the plate-like member. The configuration is preferably applied, for example, to a case in which the vehicle component is an electric component such as a control device 18.

Further, in the above embodiment, the seat frame 60 that is dividable into upper and lower parts is further provided, and thereby, it is possible to use an inner space of the seat frame 60 as an accommodation space. Additionally, by making the upper seat frame 61 to be open, it is possible to easily accommodate the vehicle component to the inner space of the seat frame 60.

Further, in the above embodiment, the seat frame 60 is formed of the electrically conductive member and includes the hydrogen tank accommodation part 63 that accommodates the hydrogen tank 12, and thereby, an electric potential is sparsely distributed via the main frame 5b from the seat frame 60. Therefore, according to a grounding effect, it is possible to prevent static electricity from being generated in the vicinity of the hydrogen tank 12.

Further, in the above embodiment, the seat frame 60 having a tube shape is further provided, and the opening part 65 that covers the exhaust port 11a which is provided at the rear part of the fuel cell stack 11 is provided at the front part of the seat frame 60, and thereby, exhaust air (besides, travel air, cooling air, and the like) which is emitted rearward from the fuel cell stack 11 can be guided smoothly to a vehicle rear part. Additionally, the connection member 70 that connects the seat frame 60 and the vehicle body frame 5 is provided at the outer position of the opening part 65, and thereby, it is possible to improve the rigidity of the vehicle body frame 5.

The above embodiment is described using an example of the motorcycle 1 that includes the drive unit 10 including an electric motor as an example of a saddle-riding-type electric vehicle; however, the embodiment is not limited thereto. For example, the saddle-riding-type electric vehicle may be a saddle-riding-type hybrid vehicle in which an engine is provided on the vehicle body side.

Further, the above embodiment is described using an example in which the cross member 30 includes the upper cross member 31 and the lower cross member 32; however, the embodiment is not limited thereto. For example, the cross member may include only the lower cross member. That is, the cross member may at least bridge a space in the vehicle width direction between the right and left downward frames and fix the fuel cell stack.

Further, the above embodiment is described using an example of a cantilever swing arm in which an arm part of the swing arm 21 is arranged only at one side (only at a left side) in the vehicle width direction of the rear wheel 4; however, the embodiment is not limited thereto. For example, the swing arm may be a double support swing arm in which the arm part of the swing arm is arranged at both sides in the vehicle width direction of the rear wheel.

The present invention is not limited to the above embodiment. For example, the saddle-riding-type electric vehicle includes all vehicles on which a driver straddles a vehicle body. The saddle-riding-type electric vehicle includes not only a motorcycle (including a motorized bicycle and a scooter-type vehicle) but also a three-wheeled vehicle (including a vehicle having two front wheels and one rear wheel in addition to a vehicle having one front wheel and two rear wheels) or a four-wheeled vehicle.

The configuration in the above embodiment is an example of the invention, and various changes such as substitution of the configuration element of the embodiment by a known configuration element can be made without departing from the scope of the invention.

The invention claimed is:

1. A fuel cell stack fixation structure for a saddle riding electric vehicle, the fuel cell stack fixation structure comprising:
   a fuel cell stack; and
   a vehicle body frame that supports the fuel cell stack, wherein
   the vehicle body frame includes:
   a pair of right and left main frames that extend rearward from a head pipe and that are arranged on an outer side in a vehicle width direction of the fuel cell stack;
   a pair of right and left downward frames that extend rearward from the head pipe and that are arranged below the pair of right and left main frames; and
   a cross member that bridges a space in a vehicle width direction between at least the right and left downward frames and that fixes the fuel cell stack thereto, the cross member comprising a lower cross member including:
   a pair of spaced apart front and rear connection plates that extend in a vehicle width direction between the right and left downward frames, and
   a fuel cell support plate that is disposed on top of the connection plates and which fixes a position of a lower part of the fuel cell stack.

2. The fuel cell stack fixation structure according to claim 1, wherein the cross member includes:
   an upper cross member that bridges a space in a vehicle width direction between the right and left main frames and that fixes the fuel cell stack, the upper cross member having an inverted U-shape and extending above a portion of the head pipe where the main frames are connected, the upper cross member including a plate-like top wall that extends in the vehicle width direction and a pair of left and right side walls integrally connected to opposite sides of the top wall; and
   the lower cross member, that bridges a space in a vehicle width direction between the right and left downward frames and that fixes the fuel cell stack.

3. The fuel cell stack fixation structure according to claim 1, further comprising:
   a vehicle component accommodation part that is arranged below the downward frame and that is configured to accommodate a vehicle component; and
   an accommodation part support member that is attached to the vehicle body frame and that supports the vehicle component accommodation part.

4. The fuel cell stack fixation structure according to claim 1, wherein
   the cross member includes a plate-like member that fixes an upper surface or a lower surface of the fuel cell stack.

5. The fuel cell stack fixation structure according to claim 1, wherein
   the cross member includes:
   an upper cross member that bridges a space in a vehicle width direction between the right and left main frames; and
   the lower cross member that bridges a space in a vehicle width direction between the right and left downward frames, and
   the upper cross member is lighter than the lower cross member.

6. The fuel cell stack fixation structure according to claim 1, wherein
   the cross member includes an upper cross member that bridges a space in a vehicle width direction between the right and left main frames, and
   the upper cross member includes a vehicle component fixation part that fixes a vehicle component at an upper surface of a plate-like member.

7. The fuel cell stack fixation structure according to claim 1, further comprising
   a seat frame that is dividable into upper and lower parts.

8. The fuel cell stack fixation structure according to claim 7, wherein
   the seat frame is formed of an electrically conductive member and includes a hydrogen tank accommodation part that accommodates a hydrogen tank.

9. The fuel cell stack fixation structure according to claim 1, further comprising
   a seat frame having a tube shape, wherein
   an opening part that covers an exhaust port which is provided at a rear part of the fuel cell stack is provided at a front part of the seat frame, and
   a connection member that connects the seat frame and the vehicle body frame, the connection member provided at an outer position of the opening part.

10. A fuel cell stack fixation structure for saddle-riding electric vehicle, said fixation structure comprising a vehicle body frame configured to support a fuel cell stack thereon, the vehicle body frame comprising:
    a head pipe;
    a pair of right and left main frames that extend rearward from the head pipe and that are configured to receive the fuel cell stack therebetween;
    a pair of right and left downward frames that extend rearward from the head pipe and that are arranged below the main frames;
    an upper cross member that bridges a space in a vehicle width direction between the right and left main frames, the upper cross member having an inverted U-shape and extending above a portion of the head pipe where the main frames are connected, the upper cross member including a plate-like top wall that extends in the vehicle width direction and a pair of left and right side walls integrally connected to opposite sides of the top wall;
    a lower cross member that bridges a space in a vehicle width direction between the right and left downward frames and that fixes the fuel cell stack thereto, the lower cross member comprising:
    a pair of spaced apart front and rear connection plates that extend in a vehicle width direction between the right and left downward frames, and
    a fuel cell support plate that is abuttingly disposed on top of the connection plates and which fixes a position of a lower part of the fuel cell stack.

11. The fuel cell stack fixation structure according to claim 10, further comprising:

a vehicle component accommodation part that is arranged below the downward frame and that is configured to accommodate a vehicle component therein; and an accommodation part support member that is attached to the vehicle body frame and that supports the vehicle component accommodation part.

12. The fuel cell stack fixation structure according to claim 10, further comprising a seat frame that is dividable into upper and lower parts, wherein the seat frame is formed of an electrically conductive material, and includes a hydrogen tank receptacle that is configured to receive a hydrogen tank.

13. The fuel cell stack fixation structure according to claim 10, further comprising a seat frame having a tubular shape, wherein an opening part, that covers an exhaust port which is provided at a rear part of the fuel cell stack, is provided at a front part of the seat frame, and further comprising a connection member that connects the seat frame and the vehicle body frame, the connection member provided at an outer position of the opening part.

* * * * *